United States Patent [19]

Sansone et al.

[11] Patent Number: 4,933,397
[45] Date of Patent: Jun. 12, 1990

[54] PREPARATION OF N-SUBSTITUTED PHENYL POLYBENZIMIDAZOLE POLYMERS

[75] Inventors: Michael J. Sansone, Berkeley Heights; Mark S. Kwiatek, Union, both of N.J.

[73] Assignee: Hoechst Celanese Corp., Somerville, N.J.

[21] Appl. No.: 315,992

[22] Filed: Feb. 27, 1989

[51] Int. Cl.$^5$ .............................................. C08G 73/18
[52] U.S. Cl. .................................... 525/435; 525/420; 528/331; 528/342; 528/348
[58] Field of Search ................ 525/435, 420; 528/331, 528/342, 348

[56] References Cited

U.S. PATENT DOCUMENTS 4,579,915  4/1986  Choe .................................... 525/435

Primary Examiner—Harold D. Anderson
Attorney, Agent, or Firm—Lynch, Cox, Golman & Mahan

[57] ABSTRACT

This invention discloses a unique process for the preparation of N-substituted phenyl polybenzimidazole polymers from unsubstituted polybenzimidazole polymers. An unsubstituted polybenzimidazole polymer is first reacted with an alkali hydride to produce a polybenzimidazole anion which is then reacted with a substituted or an unsubstituted phenyl fluoride to produce N-substituted phenyl polybenzimidazole polymer. The N-substituted phenyl polybenzimidazole polymer produced by this process can be formed into a wide range of products, such as membranes, films resins or fibers. The produce can be designed to meet special applications by the choice of the substitutent. These N-substituted phenyl polybenzimidazole polymers can be utilized for numerous applications including reverse osmosis, ultrafiltration, microfiltration, electrodialysis, ion exchange and affinity chromatography.

15 Claims, No Drawings

PREPARATION OF N-SUBSTITUTED PHENYL POLYBENZIMIDAZOLE POLYMERS

BACKGROUND OF THE INVENTION

1. Field of Invention

This invention relates to substituted polybenzimidazole polymers and processes for their production. More particularly, the invention relates to N-substituted phenyl polybenzimidazole polymers and a process for their production.

2. Prior Art

Polybenzimidazoles are a known class of heterocyclic polymers which are characterized by a high degree of thermal and chemical stability. Processes for their production are disclosed, for example, in U.S. Pat. Re. No. 26,065 and U.S. Pat. Nos. 3,313,783, 3,509,108, 3,555,389, 3,433,772, 3,408,336, 3,549,603, 3,708,439, 4,154,919 and 4,312,976. (All patents enumerated herein are incorporated by reference).

Although polybenzimidazole polymers are generally more resistant to chemical reaction than other types of polymers, such as cellulose acetate polymers, reactions at the imidazole nitrogen-hydrogen bond on the polybenzimidazole polymer will occur under certain conditions, thereby adversely affecting the performance of the polybenzimidazole polymer.

One method of reducing this reactivity is by replacing the imidazole hydrogen with a less reactive substituent to produce a substituted polybenzimidazole polymer. For example, U.S. Pat. No. 4,579,915 discloses a substituted polybenzimidazole polymer wherein the imidazole hydrogen is replaced by an aromatic substituent corresponding to the formula:

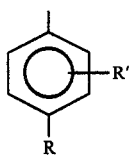

where R is nitro, cyano or trifluoromethyl and R' is hydrogen, alkyl, nitro, cyano or trifluoromethyl. Although this patent discloses a process for the production of a nitrophenyl polybenzimidazole similar to that produced by this process, it fails to disclose the process of this invention.

U.S. Pat. No. 4,377,546 discloses a phenyl substituted polybenzimidazole polymer. However, this patent also fails to disclose the instant process for production of an N-substituted phenyl polybenzimidazole polymers.

U.S. Pat. No. 3,943,125 discloses a vast array of substituted tetraamino, heterocyclic compounds useful in the preparation of substituted polybenzimidazole polymers. However, the process for production of the substituted polybenzimidazole polymers disclosed in the '125 patent is significantly different from that disclosed in the instant invention.

U.S. Pat. No. 3,518,234 discloses aryl substituted polybenzimidazole polymers, but also fails to disclose the instant process for the production of N-substituted phenyl polybenzimidazole polymers.

U.S. Pat. Nos. 3,578,644 and 4,549,388 disclose processes for the production of hydroxyl modified polybenzimidazoles, but fail to disclose N-substituted phenyl polybenzimidazole polymers or a process for their production.

Accordingly, it is an object of the present invention to prepare N-substituted phenyl polybenzimidazole polymers.

It is a further object of this invention to prepare N-substituted phenyl polybenzimidazole polymers that exhibit a high degree of chemical and thermal stability.

It is a still further object of this invention to prepare N-substituted phenyl polybenzimidazole polymers directly from unsubstituted polybenzimidazole polymers.

It is an additional object of this invention to prepare N-substituted phenyl polybenzimidazole polymers using an alkali hydride to generate polybenzimidazole anions which are subsequently reacted with a substituted phenyl fluoride to generate N-substituted phenyl polybenzimidazole polymers.

These and other objects, as well as the scope, nature and utilization of the process, will be apparent to those skilled in the art from the following description and appended claims.

SUMMARY OF THE INVENTION

The present invention involves a process for the production of substituted polybenzimidazole polymers as follows:

a. preparing a polybenzimidazole polymer solvent solution;

b. reacting the polybenzimidazole polymer with an alkali hydride to generate a polybenzimidazole anion; and c. reacting the polybenzimidazole anion with a substituted or unsubstituted phenyl fluoride having the general formula of:

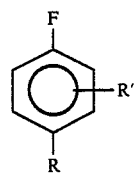

wherein R is a strong electron withdrawing group in the para position to the fluoride group and, preferably nitro, cyano or trifluoromethyl with nitro the preferred substitute and wherein R' is in the meta position to the fluoride group and is selected from the group consisting of hydrogen, alkyl, pyridyl, halo, cyano, or nitro groups to produce an N-substituted phenyl polybenzimidazole polymer.

The N-substituted phenyl polybenzimidazole polymer produced by this process can be formed into a wide range of products such as membranes, films, resins or fibers. Because these products are formed from N-substituted phenyl polybenzimidazole polymers, they are extremely resistant to chemical reaction and exhibit high strength and thermal stability.

DETAILED DESCRIPTION OF THE DRAWINGS

A. The Starting Material

The polybenzimidazole starting materials are a known class of heterocyclic polymers which are characterized by a recurring unit of the following Formulas I and II:

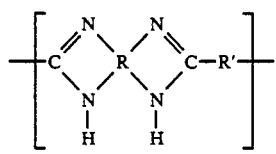

FORMULA I wherein R is a tetravalent aromatic nucleus, preferably symmetrically substituted, with the nitrogen atoms forming the bibenzimidazole rings being paired upon adjacent carbon atoms, i.e., ortho carbon atoms, of the aromatic nucleus, and R' is a member of the class consisting of (1) an aromatic ring, (2) an alkylene group (preferably those having four to eight carbon atoms), and (3) a heterocyclic ring from the class consisting of (a) pyridine, (b) pyrazine, (c) furan, (d) quinoline, (e) thiophene, and (f) pyran; and

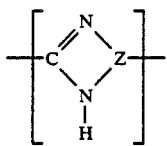

FORMULA II wherein Z is an aromatic nucleus having the nitrogen atoms forming the benzimidazole ring paired upon adjacent carbon atoms of the aromatic nucleus.

Preferably, aromatic polybenzimidazoles are selected from polymers consisting essentially of recurring units of Formulas I and II wherein R' is an aromatic ring or a heterocyclic ring.

Polybenzimidazoles having the recurring units of Formula II may be prepared by self-condensing a trifunctional aromatic compound containing only a single set of ortho-disposed diamino substituent. Exemplary of polymers of this type is poly-2,5(6)-benzimidazole prepared by the autocondensation of phenyl-3,4-diaminobenzoate.

The aromatic polybenzimidazoles having the recurring units of Formula I may be prepared by condensing an aromatic tetraamine compound containing a pair of ortho-diamino substituents on the aromatic nucleus with a dicarboxyl compound selected from the class consisting of (a) the diphenyl ester of an aromatic dicarboxylic acid, (b) the diphenyl ester of a heterocyclic dicarboxylic acid wherein the carboxyl groups are substituents upon carbon in a ring compound selected from the group consisting pyridine, pyrazine, furan, quinoline, thiophene and pyran and (c) an anhydride of an aromatic dicarboxylic acid.

Examples of polybenzimidazole which have the recurring structure of Formula I are as follows:
poly-2,2'-(m-phenylene)-5,5'-bibenzimidazole;
poly-2,2'-(pyridylene-3",5")-5,5'-bibenzimidazole;
poly-2,2'-(furylene-2",5")-5,5'-bibenzimidazole;
poly-2,2'-(napthalene-1",6")-5,5'-bibenzimidazole;
poly-2,2'-(biphenylene-4",4")-5,5'-bibenzimidazole;
poly-2,2'-amylene-5,5'-bibenzimidazole;
poly-2,2'-octamethylene-5,5'-bibenzimidazole;
poly-2,2'-(m-phenylene)-diimdazobenzene;
poly-2,2'-cyclohexeneyl-5,5'-bibenzimidazole;
poly-2,2'-(m-phenylene)-5,5'-di(benzimidazole)ether;
poly-2,2'-(m-phenylene)-5,5'-di(benzimidazole) sulfide;
poly-2,2'-(m-phenylene)-5,5'-di-(benzimidazole)methane;
poly-2,2'-(m-phenylene)-5,5'-di(benzimidazole)propane-2,2'; and
poly-2,2'-(m-phenylene)-5',5"-di(benzimidazole)ethylene-1,2, where the double bonds of the ethylene groups are intact in the final polymers.

The preferred polybenzimidazole for use in the present process is one prepared from poly-2,2'-(m-phenylene)-5,5'-bibenzimidazole, the recurring unit which is;

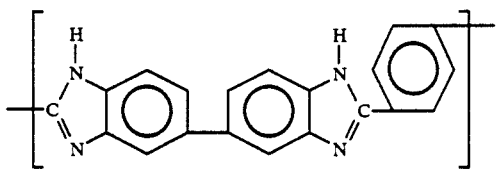

Any polymerization process known to those skilled in the art may be employed to prepare the polybenzimidazole polymer which is utilized as the starting material for the present invention. With respect to aromatic polybenzimidazoles, preferably, equimolar quantities of the monomeric tetraamine and dicarboxyl compound may be introduced into a first stage melt polymerization reaction zone and heated therein at a temperature above about 200° C., preferably at least 250° C., and more preferably from about 270° C. to 300° C. The reaction is conducted in a substantially oxygen-free atmosphere, i.e., below about 20 ppm oxygen and preferably below about 8 ppm oxygen, until a foamed prepolymer is formed. Usually, the first stage reaction is continued until a prepolymer is formed having an inherent viscosity, expressed in deciliters per gram, of at least 0.1, and preferably from about 0.13 to 0.3 (determined from a solution of 0.4 grams of the polymer in 100 milliliters of 97 percent $H_2SO_4$ at 25° C.).

After the conclusion of the first stage reaction, which normally takes at least 0.5 hours and preferably 1 to 3 hours, the formed prepolymer is cooled and then powdered or pulverized in any convenient manner. The resulting prepolymer powder is then introduced into a second stage polymerization reaction zone wherein it is heated under substantially oxygen-free conditions to yield a polybenzimidazole polymer product, desirably having an I.V., of at least 0.4, (e.g., 0.8 to 1.1 or more).

The temperature employed in the second stage is at least 250° C., preferably at least 325° C., and more preferably from about 350° C. to 425° C. The second stage reaction generally takes at least 0.5 hours, and preferably from about 1 to 4 hours or more. It is, of course, also possible to prepare the instant polymers via a one-step reaction. However, the previously described two-step process if preferred.

B. The Polymer Solution

The solvents utilized to form the polybenzimidazole polymer solution include those solvents which are commonly recognized as being capable of dissolving the particular polybenzimidazole polymer. For example, the solvents may be selected from those commonly utilized in the formation of a polybenzimidazole dry spinning solution including N-N-dimethylacetamide, N,N-dimethylformamide, dimethylsulfoxide, and N-methyl-2-pyrroliodone. The particularly preferred solvents are N,N-dimethylacetamide and N-methyl-2-pyrrolidone. Additional representative solvents include formic acid and sulfuric acid.

The polymer solution may be prepared for example, by dissolving sufficient polybenzimidazole in the solvent to yield a final solution containing from about 1 to about 35 percent by weight of the polymer based on the total weight of the solution. When the solution contains concentrations of polybenzimidazole polymer less than about five percent, the substitutions obtained are less than optimum. When the concentration of the polybenzimidazole polymers are above about 25 percent, the solution tends to be too viscous. Although this high viscosity can be overcome by heating the polymer solution, in a preferred embodiment, the concentration of the polybenzimidazole polymer ranges from about 5 to about 25 percent by weight. The quantity of the polybenzimidazole dissolved in the solvent should be such that the resulting solution has a viscosity of about 50 to about 4,000 poises at 30° C. and preferably from about 400 to about 600 poises.

One suitable means of dissolving the polymer in the solvent is by mixing the materials at a temperature above the normal boiling point of the solvent, for example, about 25° C. to about 120° C. above such boiling point, at a pressure of about 2 to about 15 atmosphere for a period of about 1 to about 5 hours under constant stirring. The resulting solution is preferably filtered to remove any undissolved polymer. A minor amount of lithium chloride (from about 0.5 to about 5 percent by weight based on the weigh to the polybenzimidazole in the solution) optionally may be added to the solution to prevent the polybenzimidazole polymer from phasing out of the solution upon standing for extended periods of time.

C. Formation of the Polybenzimidazole Anion

To the polybenzimidazole polymer solution is added an alkali hydride to generate the polybenzimidazole anion as shown in the following reaction using the polybenzimidazole polymer disclosed in Formula I:

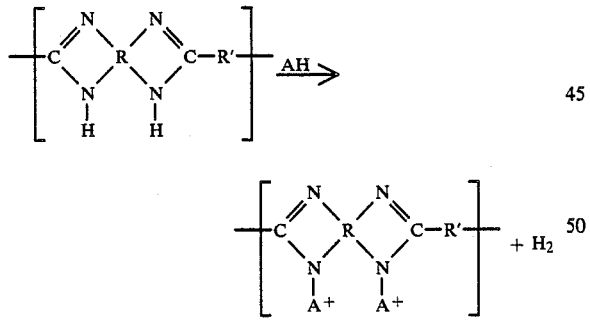

wherein the polybenzimidazole polymer is as previously disclosed and A is an alkali cation selected from the group consisting of lithium, sodium or potassium.

Although any alkali hydride, such as lithium, sodium or potassium hydride may be used in the reaction, lithium hydride is preferred for several reasons. The lithium salts generated in the subsequent substitution reaction do not interferingly react with the N-substituted phenyl polybenzimidazole polymers produced. Further, it is presumed that the small ionic radius of the lithium cation allows it to be well solvated, which disrupts the ion pairing between it and the polybenzimidazole anion. The disruption increases the solubility of the lithium salt and simultaneously generates a more nucleophilic polybenzimidazole anion, which is thus more reactive.

Although low concentrations of the alkali hydride can be used, in a preferred embodiment the ratio of alkali hydride groups to the available imidazole nitrogen-hydrogen sites on the polybenzimidazole polymer should be about 0.01:1 to about 2:1 and, in a more preferred embodiment, the ratio is from about 0.25:1 to about 1:1. When stoichiometric quantities of the alkali hydride in relationship to the available imidazole nitrogen-hydrogen sites on the polybenzimidazole polymer are reacted with a polybenzimidazole polymer, at least about 60 percent of the available imidazole nitrogen-hydrogen sites are ionized. Higher concentrations of the alkali hydride produce greater percentages of ionization of the polybenzimidazole polymer, which subsequently result in greater substitutions on the polybenzimidazole polymer in the succeeding substitution reaction. However, no significant increase in substitution is achieved when the ratio of alkali hydride to the available imidazole/nitrogen hydrogen sites exceeds about 2:1.

Following the addition of the alkali hydride to the polybenzimidazole polymer solution, the solution is heated to a temperature of about 50° C. to about 120° C. and allowed to react under constant stirring for a period of about 5 to about 48 hours. During the polybenzimidazole polymer ionization reaction, hydrogen gas evolves and is discharged. When hydrogen gas evolution ceases, it may be assumed that the reaction has gone to completion.

D. The Substitution Reaction

It has been found that once the alkali hydride removes imidazole hydrogen to create the polybenzimidazole anion, a wide variety of N-substituted phenyl substitutions on the polybenzimidazole anion are possible. To produce these selected N-substituted phenyl polybenzimidazole polymers, a substituted or unsubstituted phenyl fluoride compound is reacted with the polybenzimidazole anion. It has been discovered that the use of the fluoride anion is critical to the reaction since the fluoride anion can be more readily replaced by nucleophiles than can other halide anions.

The substituted phenyl fluoride has the general formula of:

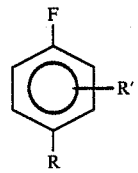

wherein R is a strong electron withdrawing group in position to the fluoride group preferably nitro, cyano or trifluoromethyl and, most preferably, nitro and R is in the meta position to the flupride group and consists of hydrogen, alkyl pyridyl, halo, cyano, or nitro groups.

It is also preferred that the carbon adjacent to the fluoride be unsubstituted, since substitutions on this carbon atoms may reduce or eliminate the reactivity of the fluoride compound. Although the concentration of the substituted phenyl fluoride is not critical, to produce N-substituted phenyl polybenzimidazole polymers with at least about 20 percent of the available imidazole anion sites substituted, at least about a stoichiometric concentration of the substituted phenyl fluoride reactant, when compared to the available imidazole anion sites, should be added to the polybenzimidazole anion solution. By increasing the concentration of the substituted phenyl fluoride reactant, higher percentages of substitution can be achieved. In a preferred embodiment, the ratio of the substituted phenyl fluoride reactant to the available polybenzimidazole anion sites ranges from about 0.25:1 to about 1:1. Higher concentrations fail to achieve significantly higher substitutions.

Since the percentage of substitution on the polybenzimidazole polymer starting material is partially dependent upon the percentage of polybenzimidazole anions produced, higher percentages of substitution are only possible when the hydride reaction also generates high percentages of polybenzimidazole anions. Thus, in a preferred embodiment the ratios of both the alkali hydride to the imidazole nitrogen-hydrogen sites and of the unsubstituted phenyl fluoride reactant to the available polybenzimidazole anion sites are both from about 0.25:1 to about 1:1.

To complete the reaction, the substituted phenyl halide reactant may simply be added to the polybenzimidazole anion polymer solution at room temperature. However, to prevent localized precipitation, it is preferred to mix the substituted phenyl fluoride reactant with an equal or lessor quantity of the solvent for the polybenzimidazole solution prior to the addition of the reactant.

After addition of the substituted phenyl fluoride, the mixture is heated to a temperature of between about 70° C. and about 200° C. and allowed to react under constant stirring for a period of about 10 to about 48 hours. Higher molecular weight substituted phenyl fluoride reactants may require higher temperatures of reaction and greater reaction times. In a preferred embodiment, the reaction is allowed to run at a temperature of about 120° C. to about 175° C. for a period of 15 to 36 hours.

In an example of the instant process, the reaction of the polybenzimidazole anion with paranitrofluorobenzene goes to completion by the following reaction scheme using the polybenzimidazole anion previously disclosed:

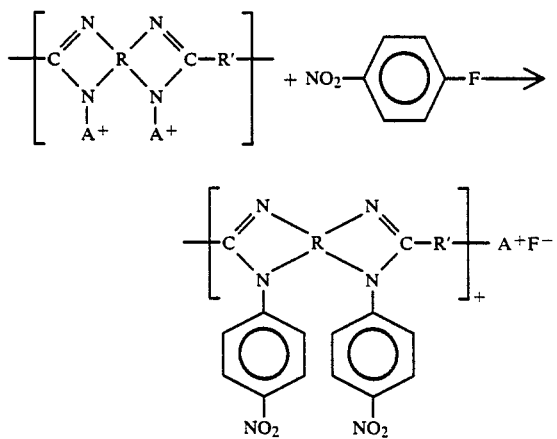

To precipitate the N-substituted phenyl polybenzimidazole polymer from solution, a non-solvent for the N-substituted phenyl polybenzimidazole is added to the reaction vessel. Preferably, an aqueous solution is used as the precipitating agent, although other non-solvents, such as acetone may be used. The N-substituted phenyl polybenzimidazole polymer is then filtered and washed with a non-solvent for the N-substituted phenyl polybenzimidazole polymer to remove excess solvent. Preferably, the non-solvent wash solution is comprised of water or acetone.

The N-substituted phenyl polybenzimidazole polymer produced by this process may be converted to products exhibiting wide range of utility, especially in the separation field. Membranes, fibers, beads, and films made from the N-substituted phenyl polybenzimidazoles exhibit a wide range of physical and morphological properties which allow them to be utilized in a variety of applications including, but not limited to, reverse osmosis, ultrafiltration, microfiltration, electrodialysis, ion exchange, and affinity chromatography. The polymer can be tailored to meet a specific application by a judicious choice of the substituent. In addition, increased stability in some environments can also be achieved by the substitution thus preventing deleterious reactions from occurring at the imidazole nitrogen.

The following example is given as a specific illustration of the invention. All parts and percentages are by weight unless otherwise stated. It is understood, however, that the invention is not limited to the specific details set forth in the example.

EXAMPLE

To a round bottom reaction vessel were added 1292.7 grams of 15 percent by weight poly-2-2'(m-benzylene)-5,5'-bibenzimidazole polymer solution dissolved in N,N dimethylacetamide. The solution was heated to 80° C. and over a three hour period 7.6 grams of lithium hydride were added. The solution was maintained at that temperature under constant stirring for 17 hours. 89 grams of paranitrobenzene were mixed with 60 grams of N,N dimethylacetamide, placed in an additional funnel and added to the reaction solution. The temperature of the solution was raised to 150° C. over a three hour period and held at that temperature for 24 hours. Nuclear magnetic resonance spectroscopy was run on the reaction product, which disclosed a 50 percent substitution with

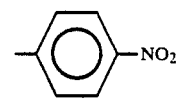

at the imidazole nitrogen sites on the polymer.

As is apparent form this Example, a variety of N-substituted phenyl polybenzimidazole polymers can be produced exhibiting a high percentage of substitution. These N-substituted phenyl polybenzimidazole polymers can be used for the production of broad range of separatory articles such as membranes, fibers or films. Since these polybenzimidazole polymers are substituted, they will be less reactive and produce more stable products.

We claim:

1. A process for the production of N-substituted phenyl polybenzimidazole polymers which comprises the following steps:
   a. preparing a polybenzimidazole polymer solvent solution;
   b. reacting the polybenzimidazole polymer with an alkali hydride to form a polybenzimidazole anion; and c. reacting the polybenzimidazole anion with a substituted phenyl fluoride having the general formula of:

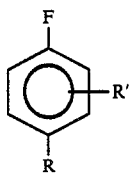

wherein R is a strong electron withdrawing group in the para position to the fluoride group and wherein R' is in the meta position to the fluoride group and is selected from the group consisting of hydrogen, alkyl, pyridyl, halo, cyano, and nitro to produce an N-substituted phenyl polybenzimidazole polymer.

2. A process for the production of N-substituted phenyl polybenzimidazole polymers which comprises the following steps:
   a. preparing a polybenzimidazole polymer solvent solution;
   b. reacting the polybenzimidazole polymer in the solution with lithium hydride to form a polybenzimidazole anion; and
   c. reacting the polybenzimidazole anion with a substituted phenyl fluoride having the general formula of:

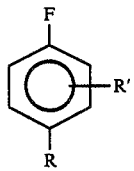

wherein R is selected from the group consisting of nitro, cyano and trifluoromethyl and is located in the para position to the fluoride group and wherein R' is in the meta position to the fluoride group and is selected from the group consisting of hydrogen, alkyl, pyridyl, halo, cyano, or nitro to produce an N-substituted phenyl polybenzimidazole polymer.

3. A process for producing N-substituted phenyl polybenzimidazole polymers which comprises the following steps:
   a. preparing a polybenzimidazole polymer solvent solution wherein the polybenzimidazole polymer consists essentially of recurring units of the following formula:

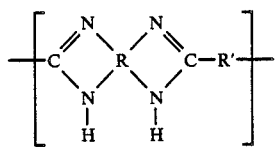

wherein R is a tetravalent aromatic nucleus, with the nitrogen atoms forming the benzimidazole rings being paired upon adjacent carbon atoms, and R' is a member of the class consisting of (1) an aromatic ring, (2) an alkylene group and (3) a heterocyclic ring from the class consisting of (a) pyridine, (b) pyrazine, (c) furan, (d) quinoline, (e) thiophene, and (f) pyran;
   b. reacting the polybenzimidazole polymer with lithium hydride, wherein the ratio of the lithium hydride to the available imidazole nitrogen-hydrogen sites on the polybenzimidazole polymer is from about 0.01:1 to about 5:1, to produce a polybenzimidazole anion; and
   c. reacting the polybenzimidazole anion with paranitrobenzene to produce paranitrophenyl polybenzimidazole.

4. The process of claim 1 wherein the alkali hydride is selected from the group consisting of lithium hydride, potassium hydride, and sodium hydride.

5. The process of claim 1 wherein the alkali halide is lithium hydride.

6. The process as in any of claims 1 or 2 wherein the polybenzimidazole polymer starting material is comprised of recurring momeric units of:

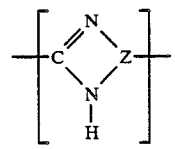

wherein Z is an aromatic nucleus having the nitrogen atoms forming the benzimidazole ring paired upon adjacent carbon atoms of the aromatic nucleus.

7. The process as in any of claims 1, 2 or 3 wherein the solvent capable of dissolving the polybenzimidazole polymer is selected from the group consisting of N,N-dimethylacetamide, N,N-dimethylformamide, dimethylsulfoxide and N-methyl-2-pyrrolidone.

8. The process as in any of claims 1, 2 or 3 wherein the concentration of the polybenzimidazole polymer in the solvent solution is from about 5 to about 25 percent by weight based on the total solution weight.

9. The process as in any of claims 1, 2 or 3 wherein the ratio of alkali hydride groups to the available imidazole nitrogen hydrogen sites on the polybenzimidazole polymer is from about 0.01:1 to about 2:1.

10. The process as in any of claims 1, 2 or 3 wherein the ratio of alkali hydride groups to the available imidazole nitrogen hydrogen sites on the polybenzimidazole polymer is from about 0.25:1 to about 1:1.

11. The process as in any of claims 1, 2 or 3 wherein the percentage of polybenzimidazole anions produced is at least about 20 percent.

12. The process as in any of claims 1, 2 or 3 wherein the alkali hydride is reacted with the polybenzimidazole polymer at a temperature of about 50° C. to about 120° C. for a period of about 5 to 48 hours.

13. The process as in any of claims 1 or 2 wherein the carbon adjacent to the fluoride on the substituted phenyl fluoride is unsubstituted.

14. The process as in any of claims 1, 2 or 3 wherein the ratio of the substituted phenyl fluoride to the available polybenzimidazole anion sites ranges from about 0.25 to about 1:1.

15. The process as in any of claim 1, 2 or 3 wherein the substituted phenyl fluoride is reacted with the polybenzimidazole polyanion at a temperature from about 70° C. to about 200° C. for a period of about 10 to about 48 hours.

* * * * *